United States Patent [19]

Meltzer et al.

[11] Patent Number: 5,328,977
[45] Date of Patent: Jul. 12, 1994

[54] POLYMERIZATION CATALYST FOR THE PREPARATION OF POLY(ISOCYANATES)

[75] Inventors: Aaron D. Meltzer, Pittsburgh; Gary W. Munko, Coraopolis; Harald Pielartzik, Pittsburgh, all of Pa.

[73] Assignee: Miles Inc., Pittsburgh, Pa.

[21] Appl. No.: 151,227

[22] Filed: Nov. 12, 1993

[51] Int. Cl.$^5$ ............................................. C08G 18/22
[52] U.S. Cl. ...................................................... 528/56
[58] Field of Search ............................................. 528/56

[56] References Cited

U.S. PATENT DOCUMENTS

| | | | |
|---|---|---|---|
| 3,673,159 | 6/1972 | Dijkhuizen et al. | 528/56 |
| 3,681,473 | 8/1972 | Chow et al. | 528/73 |
| 4,224,431 | 9/1980 | Heiss | 528/48 |
| 5,064,871 | 11/1991 | Sciangola | 528/56 |

Primary Examiner—John Kight, III
Assistant Examiner—Shelley A. Dodson
Attorney, Agent, or Firm—Joseph C. Gil; Aron Preis

[57] ABSTRACT

An improvement in the process of preparing nylon-1 by the polymerization of isocyanates is disclosed. Accordingly, the improvement comprising using in the process a catalyst conforming to $$(X)_n Me(OR)_m$$

where Me is titanium or zirconium, X is chlorine or bromine atom, R is an aliphatic radical having 1 to 20 carbon atoms and where the sum of m=n is 4 with the proviso that where Me is titanium n is 1 or 2, and where Me is zirconium n is 1–4.

7 Claims, No Drawings

POLYMERIZATION CATALYST FOR THE PREPARATION OF POLY(ISOCYANATES)

The invention relates to catalytic compounds useful in the process for polymerizing isocyanates.

Catalysts which promote the reaction between an isocyanate and an isocyanate reactive compound are known. Among these mention may be made of organometal compounds and amine compounds. Processes for catalytically polymerizing methylisocyanate using certain amino compounds were disclosed in U.S. Pat. Nos. 3,300,432 and 3,367,900. A process for the preparation of homopolymers of organic isocyanates using an alkali metal anionic catalyst has been disclosed in U.S. Pat. No. 2,965,614. Also known, from U.S. Pat. No. 3,673,159 is the utility of certain organic zirconium compounds as catalysts in the manufacture of urethane compounds. A composition containing an isocyanate-reactive compound and a catalyst containing zirconium carboxylate has been disclosed in U.S. Pat. No. 5,064,871. U.S. Pat. No. 3,406,197 is noted to have disclosed transition metal carbonyl catalysts for converting organic isocyanates to carbodiimides. Titanium and zirconium are among the suitable metals.

The catalytic polymerization reaction of isocyanate to form nylon-1 has been disclosed in "Living Coordination Polymerizations of Isocyanates" by Timothy E. Patten et al, in Polymer Preprints 32(2), 1991, p. 625. Trifluoroethoxy titanium trichloride was reported there as the catalyst for the reaction. Also relevant for its disclosure of the preparation of nylon-1 is the presently co-pending U.S. patent application Ser. No. 07/970,670 which was filed Nov. 3, 1992. Here too, trifluoroethoxy titanium trichloride was reported to catalyze the reaction.

Recent experimental work has shown that neither titanium tetrachloride, nor titanium tetra alkoxy compounds are efficient catalysts for the process. Similarly, the corresponding zirconium compounds are inefficient in catalyzing the reaction.

The present invention is predicated on the finding that efficient catalysis of the reaction is attained by the use of a metal complex corresponding to

wherein Me is titanium or zirconium and X is chlorine or bromine atom, preferably chlorine, R is an aliphatic radical having 1 to 20 carbon atoms, preferably an alkyl radical, more preferably a $C_{1-8}$ alkyl radical, and where the sum of m and n is 4, and where in the embodiments where Me is titanium n is 1 or 2, preferably 1 and in the embodiment where Me is zirconium n is 1 to 4.

It was also found that trifluoroethoxy titanium trichloride although an efficient catalyst for the polymerization process for the preparation of nylon-1 is less desirable than the catalysts of the present invention. It was determined that the trichloride compound readily reacts with moisture in the air and looses its catalytic efficacy and thus requires special handling care. By comparison, the catalysts of the present invention are less reactive with moisture in the air and are easier to handle.

The general process for the preparation of nylon-1 by anionic or coordination polymerization of isocyanate monomers or adducts is known. The product, nylon-1, is characterized in that it contains structural units conforming to

In carrying out the reaction in the presence of the catalysts of the present invention it is preferred to use a hydrocarbon solvent or a mixture of such solvents.

The isocyanate monomers and adducts suitable in the reaction are known. These include $RCH_2NCO$ where R is a $C_1-C_{20}$, preferably $C_4-C_{18}$ alkyl, alkylaryl cycloalkyl or aryl radicals. Also included and specifically mentioned are polyfunctional compounds hexamethylene diisocyanate, 2-methylpentyl-1,5-diisocyanate, butyldiisocyanate and ethyl diisocyanate. The resulting product, nylon-1, produced in accordance with the inventive process is accompanied by isocyanurate.

EXPERIMENTAL

A. The preparation and use of titanium catalysts:

1. The preparation of a dibutyltitanium dichoride catalyst:

To a 100 ml (milliliter) round bottom flask were added 25 ml of dry toluene and 17.5 g (gram) (0.051 mole) of tetrabutyl titanium. The flask was flushed with nitrogen and 5.6 ml of titanium tetrachloride (0.051 mole) were added. The reaction mixture was stirred at room temperature for 4 hours and stored under inert atmosphere.

2. Tris(isopropoxy)titanium chloride is available commercially.

3. The preparation of nylon-1: To 250 ml round bottom flask were added 20 g HDI (0.12 mole) and 100 ml of xylene.

Tris(isopropoxy)titanium chloride (3 g, 0.01 mole) was added to the solution at room temperature. Within 3 hours the solvent was completely gelled. The gel was broken up by the addition of hexane. The resulting solid was filtered off and dried. IR (neat): 1695 cm$^-$. This band is characteristic for the carbonyl of nylon-1 polymers.

4. To 250 ml round bottom flask were added 30 g butylisocyanate (0.30 mole) and 150 ml of xylene. Tris(isopropoxy)titanium chloride (1.1 g, 0.004 mole) was added to the solution at room temperature. The solution became rather viscous within 18 hours, and was precipitated into petroleum ether, and dried. IR (neat): 1695 cm$^{-1}$.

5. To 250 ml round bottom flask were added 30 g octylisocyanate (0.19 mole) and 150 ml of xylene. Tris(isopropoxy)titanium chloride (1.0 g, 0.004 mole) was added to the solution at room temperature. After 24 hours the solution was diluted with a petroleum ether/methanol solution (500 ml/50 ml). The solvent was removed under reduced pressure to yield a yellow oil. IR (neat): 1695 cm$^{-1}$.

6. To 250 ml round bottom flask were added 20 g HDI (0.12 mole) and 100 ml of xylene. The catalyst prepared in 1 above was added to the solution at room temperature. After 3 hours the solution was viscous, turning gelatinous within 20 hours. The solution was precipitated with petroleum ether (100 ml) filtered and dried. IR (neat): 1695 cm$^{-1}$.

B. The preparation and use of zirconium catalysts

7. The preparation of trisbutoxy zirconium chloride: $ZrCl_4$ (7.5 g, 0.032 mole) were placed in a 250 ml 3-neck flask. The flask was fitted with a condenser and a dripping funnel and tetrabutoxy Zirconium—Zr(OBu)$_4$—(25.5 g of an 80% solution in butanol) was placed in the dripping funnel. The reaction vessel was fitted with septa, and flushed with nitrogen. Dry toluene (32 ml) was cannulated into the flask and the Zr(OBu)$_4$ was slowly added. Upon complete addition, the solution was warmed to ca. 80° C. until the evolution of HCl was no longer detected.

8. The preparation of dibutoxy zirconium dichloride: $ZrCl_4$ (16.1 g, 0.069 mole) were placed in a 250 ml 3-neck flask. The flask was fitted with a condenser and a dripping funnel and tetrabutoxy zirconium—Zr(OBu)$_4$—(25.5 g of an 80% solution in butanol) was placed in the dripping funnel. The reaction vessel was fitted with septa, and flushed with nitrogen. Anhydrous toluene (34.5 ml) was cannulated into the flask and the Zr(OBu)$_4$ was slowly added. Upon complete addition, the solution was warmed to ca. 80° C. until the evolution of HCl was no longer detected, that is about 90 minutes. 9. The preparation of the trispropoxy zirconium chloride followed in an analogous manner to the procedure outlined in 7 above except that tetrapropoxy zirconium was used in place of Zr(OBu)$_4$.

10. The preparation of the dipropoxy zirconium dichloride followed in an analogous manner to the procedure outlined in 8 above except that tetrapropoxy zirconium was used in place of Zr(OBu)$_4$.

11. To a 125 ml Erlenmeyer flask were added 20 g HDI, 90 ml dry xylene and 14 ml of the ClZr(OBu)$_3$ solution prepared in example 7. The solution was stirred at room temperature. The viscosity rose to the gel point within 3 hours. The material was dried and characterized by IR.

12. To a 125 ml Erlenmeyer flask were added 20 g HDI and 90 ml dry xylene. The solution was cooled to −10° C. and 14 ml of the ClZr(OBu)$_3$ solution prepared in example 7 were added to the reaction flask. The solution was stirred at −10° C. for 15 hours, during which time the solution gelled. The material was dried and characterized by IR.

13. To a 125 ml Erlenmeyer flask were added 20 g HDI, 90 ml dry xylene and 14 ml of the Cl$_2$Zr(OBu)$_2$ solution prepared in example 8. The solution was stirred at room temperature. The viscosity rose to the gel point within 14 hours. The material was dried and characterized by IR.

14. To a 125 ml Erlenmeyer flask were added 20 g HDI and 90 ml dry xylene. The solution was cooled to −10° C. and 14 ml of the Cl$_2$Zr(OBu)$_2$ prepared in example 8 were added to the reaction flask. The solution was stirred at −10° C. for 5 days, during which time the solution gelled. The material was dried and characterized by IR.

15. To a 2.0 Liter reaction kettle, fitted with a mechanical stirrer and dripping funnel, were added 160 g HDI, 520 ml dry xylene and 280 ml hexane. The reaction vessel was flushed with nitrogen. While stirring, 112 ml of the ClZr(OBu)$_3$ solution prepared in example 7 were slowly added via the dripping funnel over a period of time of about 4 hours. A white precipitate formed and was filtered off, dried and characterized by IR. The IR characterization point to that the product is mostly nylon-1 containing some isocyanurate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process of preparing nylon-1 by the polymerization of isocyanates, the improvement comprising using a catalyst conforming to $$(X)_n Me(OR)_m$$

where Me is titanium or zirconium, X is chlorine or bromine atom, R is an aliphatic radical having 1 to 20 carbon atoms and where the sum of m+n is 4 with the proviso that where Me is titanium n is 1 or 2, and where Me is zirconium n is 1–4.

2. The process of claim 1 wherein X is chlorine.

3. The process of claim 1 wherein said R is an alkyl radical.

4. The process of claim 3 where R is a $C_{2-8}$ alkyl radical.

5. The process of claim 1 wherein Me is titanium.

6. The process of claim 5 wherein said n is 1.

7. The process of claim 1 wherein Me denotes zirconium.

* * * * *